United States Patent [19]
Brainard et al.
[11] Patent Number: 4,567,072
[45] Date of Patent: Jan. 28, 1986

[54] ARTICLE EXHIBITING APPARENT LUMINESCENCE AND ITS METHOD OF MANUFACTURE

[75] Inventors: Ron P. Brainard, Columbus; L. Wayne Cassidy, Groveport, both of Ohio

[73] Assignee: Murfin Incorporated, Columbus, Ohio

[21] Appl. No.: 652,931

[22] Filed: Sep. 21, 1984

[51] Int. Cl.[4] .......... B05D 3/06; C09J 7/02; B32B 3/02

[52] U.S. Cl. .......... 428/40; 427/54.1; 428/141; 428/216; 428/352; 428/354; 428/913

[58] Field of Search .......... 428/216, 40, 343, 345, 428/352, 354, 458, 913, 141; 427/54.1

[56] References Cited

U.S. PATENT DOCUMENTS

| | | | |
|---|---|---|---|
| 3,118,781 | 1/1964 | Downing | 428/458 |
| 4,246,315 | 1/1981 | Kopp et al. | 428/345 |
| 4,278,728 | 7/1981 | Honda et al. | 427/54.1 |
| 4,310,587 | 1/1982 | Beaupre | 428/458 |
| 4,379,805 | 4/1983 | Downing et al. | 428/354 |

*Primary Examiner*—William J. Van Balen
*Attorney, Agent, or Firm*—John L. Gray

[57] ABSTRACT

An article of manufacture which either appears luminescent or which may be used to make a specular reflective coating appear luminescent comprising a base film of from 0.00025 to 0.375 inches in thickness and an ultraviolet curable film of from 0.00025 to 0.010 inches in thickness is disclosed, as is a method of making said article of manufacture. The material may be provided with an adhesive and a releasable backing strip on the side opposite the ultraviolet curable film and the ultraviolet curable film may include a pigment or a transparent colored ink layer may be included between the ultraviolet curable film and the base film. Alternatively, if the base film is transparent it may be applied through the use of a clear pressure-sensitive adhesive to existing metalized media.

20 Claims, 3 Drawing Figures

FIG. 1
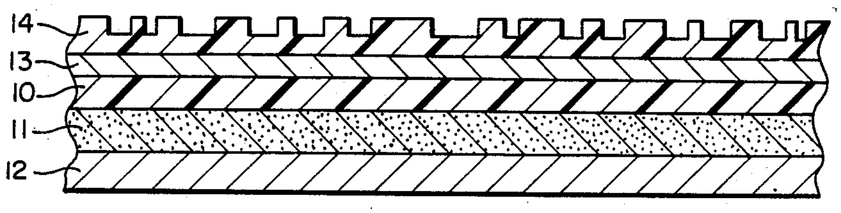
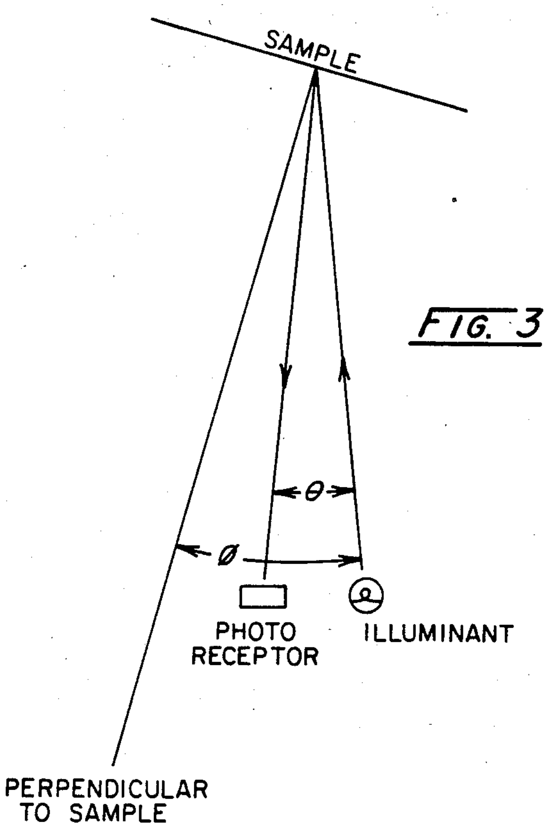
FIG. 3

ARTICLE EXHIBITING APPARENT LUMINESCENCE AND ITS METHOD OF MANUFACTURE

BACKGROUND OF THE INVENTION

"Retroreflective" is defined in ASTM E 284-81*a*, *Standard Definitions of Terms Relating to Appearance of Materials*, as "reflection characterized by the flux in an incident beam being returned in the direction close to the direction from which it came, this effect occurring over a wide range of angles."

At the present time, retroreflective articles are prepared by applying transparent or translucent glass spheres to plastic film. Another plastic film or multiple films are then laminated over the spheres using heat and pressure, thus trapping and encapsulating the spheres in a controlled fashion. One side of the article is then metalized, or it may have been metalized prior to the encapsulating step, so as to reflect light. Light waves passed through the spheres are reflected by the specular metalized surface back into the spheres. The spheres refract the light waves so as to enhance and intensify the image received by the human eye. In some cases, other shapes than spheres may be used but in all cases a physical particle inclusion in the article is necessary to cause the amount of refraction so as to obtain a retroreflective characteristic.

While such retroreflective materials provide an excellent degree of retroreflectivity, the cost is typically five to ten times the cost of nonretroreflective articles that are commonly used commercially.

While the physical particle inclusion types of articles are accepted by the Department of Transportation and other agencies to meet their standards, materials for other applications where increased visibility is desired, but not necessarily of the standards required by various governmental agencies, are not available because of the prohibitive cost.

For example, point of purchase, signage or advertising media, which could include some degree of retroflectivity, need not be engineered to meet government specifications for retroreflectivity.

In order to understand the instant invention, reference to three other definitions in ASTM E 284-81*a* is made. These are:

"Specular reflection" is defined as "reflection without diffusion, in accordance with the laws of optical reflection, as in a mirror."

"Diffuse reflection" is defined as "reflection in which flux is scattered in many directions by diffusion at or below the surface."

"Diffusion" is defined as "change of the angular distribution of a beam of radiant flux by a transmitting material or reflecting surface such that the flux incident in one direction is continuously distributed in many directions, the process not conforming (on a macroscopic scale) to the laws of Fresnell (regular) reflection and refraction and there being no change in frequency (wave length) of the monochromatic component of the flux."

SUMMARY OF THE INVENTION

The instant invention modifies a specularly reflective base film that is preferably provided with a metalized surface or is placed on a metalized specularly reflective surface such that the finished product displays all three above-referenced properties, i.e., retroreflection, specular reflection, and diffuse reflection. This combination of reflectivity is hereinafter referred to as apparent luminescence, i.e., appearing to emit light. Light is not actually emitted, but, as in the case of the encapsulated sphere method of retroreflector manufacturing, is the principal optical phenomenon involved.

Retroreflective materials require that the viewer and source be in very close proximity for the material to appear illuminated. Specularly reflective materials require that the viewer and source be diametrically opposed for the material to appear illuminated. A diffusely reflecting material does not have a constraint on the relationship between the viewer and source, but has a flat appearance because of the large amount of incident flux scattered in directions other than toward the viewer. By combining these three appearance properties in one apparent luminescent product, the instant invention takes advantage of any one of a myriad of illumination sources and viewing combinations to appear luminescent.

The resultant product is useful for graphics, graphics background, signage, or other media without the inclusion of physical particles such as glass spheres, at greatly reduced costs.

The instant invention utilizes a specular layer of material of a specified range of thickness overlayed with an ultraviolet curable material within a specified range of thickness which has gone through a two-step ultraviolet curing process. The resultant product is a randomly created surface of elevated areas and depressed areas to create the apparent luminescent surface. Additional color layers may be interspersed and pigments may be employed in the ultraviolet curable layer. Furthermore, the specular layer may be attached on its other side with an adhesive to a releasable backing strip.

The glass particle included materials of the prior art will not retroreflect unless they receive light waves directly from an intense source such as a car's headlights and thus such a surface is flat and lifeless during daylight hours. Unlike the prior art, the instant invention captures scattered light from the sun or other sources and provides apparent luminescent light under such conditions.

It is therefore an object of this invention to provide an article of manufacture which will exhibit apparent luminescence for signage and other graphic arts applications.

It is also an object of this invention to provide a method of making such an article of manufacture.

It is another object of this invention to provide such an article of manufacture at a cost that is greatly reduced when compared with products made by the prior art processes.

It is a still further object of this invention to make such an article of manufacture which will provide apparent luminescence when the viewer and the source of light are angularly separated from each other.

It is a still further object of this invention to provide such an article of manufacture including color in a part or all of said apparent luminescent surface.

These, together with additional objects and advantages of the present invention, will become more readily apparent to those skilled in the art when the following detailed description is considered in light of the accompanying drawings.

BRIEF DESCRIPTION OF THE DRAWINGS

FIG. 1 is a cross-sectional view of one embodiment of the invention.

FIG. 3 is a schematic showing the positioning of various elements in order to generate data for the examples hereinafter set forth.

DETAILED DESCRIPTION OF THE INVENTION

Figure 2:
FIG. 2 is a photomicrograph of the apparent luminescent surface constituting the present invention.

Referring now more particularly to FIG. 1, a base specular reflective film 10 is provided. If desired, this film on one side may have a pressure-sensitive adhesive film 11 provided with a protective releasable backing strip 12. The base specular reflective film 10 may be provided with a layer of transparent graphics 13 which does not substantially affect the specular reflectivity of the base film. Any one of several different printing methods may be used to apply layer 13. Alternatively, the base film 10 itself may be tinted, but still transparent. Whether or not a graphics layer 13 is utilized, a transparent ultraviolet curable coating layer 14 is next applied. The area chosen to provide apparent luminescence may be the same color as the base specular reflective film 10 or may be colored by the use of transparent ink 13 between the base film and the transparent surface textured ultraviolet curable coating 14. If desired, portions of layer 13 may be opaque.

The transparent ultraviolet curable coating 14 is subjected to a two-stage ultraviolet surface texturizing process to provide the textured surface that reflects the light rays and provides apparent luminescence. The light rays are refracted as they pass through the transparent surface textured ultraviolet curable coating 14 and then are specularly reflected back from the specular reflective layer 10 through the transparent surface textured ultraviolet curable coating 14. As the light rays exit the coating 14, they are once again refracted, thus providing the apparent luminescent properties. The transparent ultraviolet textured curable coating 14 may be applied by any one of a number of existing printing or coating processes which allow accurate control of the amount of coating applied. The coating is then subjected to a two-stage ultraviolet surface texturizing process in order to provide the textured surface that refracts the light rays and provides for apparent luminescence. The first step is to subject the coating 14 to a very low intensity ultraviolet light source such as that obtained from a G30T8 germicidal lamp. The purpose of this step is to cure the surface of the coating 14 to a very small depth. Depending on the coating used, this initial ultraviolet treatment may or may not need to be performed in an inert atmosphere. It may also be necessary to control the temperature of the base material and coating during this process in order effectively to control the thickness of the top cured layer of the coating 14. The exposure necessary to perform this initial curing step is dependent upon the number of ultraviolet lamps used, the distance of the ultraviolet lamps to the coating 14, the thickness and temperature of the coating 14, the use or nonuse of reflectors around the ultraviolet of the light, and in the case of using an inert atmosphere, the degree of exclusion of oxygen from the atmosphere.

Once the first step is performed, the cured top layer of coating 14 shrinks slightly and thus provides the textured surface. It may be necessary at this point to heat the coating with an infrared or strip heater to expedite this slight film shrinkage by reducing the viscosity of the uncured layer of coating 14 below the surface and provide a more rapid processing rate. Coating 14 with its surface textured, is then subjected to a high-intensity ultraviolet light by passing the material through one of a number of commercially available ultraviolet curing units to cure the entire coating and permanently affix the textured surface in the coating.

Referring now more particularly to FIG. 2, the raised portion 15—15 of coating 14 is shown as well as the depressed portion 16—16 of coating 14. The curable coating 14 may be applied selectively to the base specular reflective material 10 in accordance with a designer's requirements or may be applied to provide full coverage. The curable coating 14 may be utilized on any substrate that can provide a reflective source as through lamination, vacuum metalization, hot stamping, etc. Examples of such substrates 10 include, but are not limited to, polyester, polycarbonate, polyethylene, polyurethane, acrylonitrile butadiene styrene, polyvinyl chloride, acetate, acrylic, polyethylene terephthalate, glass, phenolic, or other printable materials.

The radiation curable coating typically is an acrylated polyurethane, such as is available from Polychrome Chemical Corporation in New Jersey. However, similar systems such as 95 percent acrylated esters or acrylated epoxys or various other formulations may easily be used. Ink systems are available for the variety of base materials as are corresponding printing processes. If a pressure-sensitive adhesive film is used, it may be selected from any one of a multitude of solvent-based, emulsion, hot melt, or 100 percent solids adhesives, depending upon the base specular reflective film used and the end use requirements of the adhesive. The protective releasable backing strip shall be such that it will remain in contact with the pressure-sensitive adhesive film during storage of adhesive coated film, and shall be readily removed from the pressure-sensitive adhesive film prior to application without disrupting the surface of the adhesive.

The instant invention provides weathering durability in excess of 1000 hours QUV Weathering Testing. This involves alternating eight hours of ultraviolet exposure at 70° C. followed by four hours of condensation at 50° C., repetitively. The article of manufacture of the instant invention is also impervious to gasoline and similar common hydrocarbon exposures. In its silver or white version, the instant invention will provide increased visibility because of the apparent luminescence observable beyond 300 feet and in transparent colored versions will provide increased visibility beyond 200 feet. The material significantly increases visibility and draws attention during daylight hours. The cost of production is less than 1/10th the cost of currently usable materials.

Base specular reflective materials 10, which may be utilized, are available commercially in thicknesses from 0.00025 to 0.375 inches. Optimal results have been achieved with base materials with a maximum thickness of 0.005 inches. Materials of greater thicknesses have exhibited reduced apparent luminescent properties because of the increased haze and cloudiness and resultant increased light diffraction with the thicker materials. When it is necessary to produce an article on thicker material constructions, optimal results have been achieved with the utilization of a multi-laminate construction with the upper material of the multi-laminate being a specular reflective material of from 0.00025 to 0.005 inches bonded to a material to provide the overall material thickness required. The reason for this thickness limitation will be apparent from the following Examples and Tables summarizing characteristic properties of the materials produced according to the Examples.

EXAMPLE 1

A 0.0005 inch thick vacuum metalized polyester sheet 10 with pressure-sensitive adhesive and releasable backing strip on the back was provided with a transparent ultraviolet curable coating 14 of a thickness of 0.00075 inches. The sheet was placed on a conveyorized belt traveling at one foot per second and passed through a surface texturizing unit containing three G30T8 germicidal lamps placed 1.5 inches from the surface of an ultraviolet curing unit traveling at 0.75 feet per second and irradiated with a high-intensity ultraviolet lamp powered at 200 watts per inch. The dwell time between exposures was nine seconds, which allowed the top surface of the ultraviolet curable coating 14 to achieve a texture before being thoroughly cured.

EXAMPLE 2

The same procedure as in Example 1 was followed except that the vacuum metalized polyester sheet 10 was 0.003 inches in thickness.

EXAMPLE 3

The same procedure as set forth in Example 1 was followed except that the vacuum metalized polyester sheet 10 that was used was 0.005 inches in thickness.

EXAMPLE 4

The same procedure as in Example 1 was followed except that the vacuum metalized polyester sheet 10 was 0.007 inches in thickness.

The materials produced in Examples 1–4 were examined for the amount of light reflected at various illuminating and viewing angles.

In order to examine the amount of light reflected at various illuminating and viewing angles, a test apparatus was set up, which is illustrated schematically in FIG. 3. The samples were mounted in a vertical sample holder and illuminated with an incandescant light source. The resultant reflected light was measured by a photometer. The light source or illuminant and receptor of the photometer were placed at a height that placed them in a horizontal plane perpendicular to the center of the test sample. The viewing angle $\phi$ referred to in the following Tables is the angle between the source of illumination and the receptor of the photometer. The illuminating angle $\theta$ is the angle between the illuminant and a line perpendicular to the surface of the test samples.

The samples produced in Examples 1–4 were examined for the amount of light reflected at various illuminating and viewing angles. This information is set forth in the following Tables 1–4:

TABLE 1

Ø = 0°

| Sample | Ø Angle 0° | 10° | 20° | 30° | 40° | 50° | Specular Ø = 0° |
|---|---|---|---|---|---|---|---|
| | Photometer Readings | | | | | | |
| Retroreflective | 100 | 80.5 | 72.3 | 57.9 | 37.9 | 21.0 | |
| Example 1 | 63.1 | 10.8 | 7.2 | 6.2 | 5.6 | 5.1 | |
| Example 2 | 71.3 | 11.3 | 7.2 | 6.4 | 5.6 | 5.1 | |
| Example 3 | 57.9 | 11.3 | 7.2 | 6.2 | 5.6 | 5.1 | |
| Example 4 | 32.3 | 9.6 | 6.7 | 5.8 | 5.6 | 4.6 | |

TABLE 2

Ø = 15°

| Sample | Ø Angle 0° | 5° | 10° | 15° | 20° | Specular Ø = 7.5° |
|---|---|---|---|---|---|---|
| | Photometer Readings | | | | | |
| Retroreflective | 2.6 | 6.7 | 7.7 | 2.6 | 2.1 | |
| Example 1 | 8.7 | 38.5 | 37.4 | 9.7 | 5.1 | |
| Example 2 | 8.2 | 45.1 | 45.1 | 9.7 | 4.1 | |
| Example 3 | 8.7 | 42.1 | 43.6 | 9.7 | 4.6 | |
| Example 4 | 8.7 | 23.1 | 23.6 | 8.7 | 5.1 | |

TABLE 3

Ø = 30°

| Sample | Ø Angle 0° | 10° | 15° | 20° | 30° | Specular Ø = 15° |
|---|---|---|---|---|---|---|
| | Photometer Readings | | | | | |
| Retroreflective | 1.5 | 2.1 | 97.9 | 2.1 | 1.5 | |
| Example 1 | 4.1 | 46.7 | 54.9 | 47.2 | 3.6 | |
| Example 2 | 3.6 | 57.8 | 72.8 | 55.3 | 3.1 | |
| Example 3 | 3.6 | 51.8 | 68.2 | 50.8 | 3.6 | |
| Example 4 | 3.6 | 31.3 | 44.1 | 29.2 | 3.1 | |

TABLE 4

Ø = 45°

| Sample | Ø Angle 0° | 10° | 20° | 30° | 40° | Specular Ø = 22.5° |
|---|---|---|---|---|---|---|
| | Photometer Readings | | | | | |
| Retroreflective | 1.5 | 2.1 | 20.0 | 2.1 | 1.0 | |
| Example 1 | 3.1 | 5.6 | 40.0 | 8.7 | 2.6 | |
| Example 2 | 3.1 | 5.1 | 47.7 | 7.2 | 2.1 | |
| Example 3 | 3.1 | 5.6 | 44.1 | 8.2 | 2.6 | |
| Example 4 | 2.6 | 5.6 | 28.7 | 8.7 | 2.1 | |

In examining the luminescence of the sample at the retroreflective viewing angle, $\theta=0°$, Table 1, a minimum photometer reading of 7.0 corresponded to the visual perception of the apparent luminescence. When examining the diffuse and specular luminescent properties, Tables 2, 3, and 4, $\theta=15°$, 30°, and 45°, a minimum photometer reading of 2.5 corresponded to the visual perception of the apparent luminescence. A conventional glassbeaded retroreflective sample was also included in each study.

An examination of the data in Tables 1–4 will show that in general the material produced in Example 4 had decreased luminescent properties when compared to Examples 1, 2, and 3. Of course, in all instances when the $\phi$ angle is close to the specular $\phi$ angle for each $\theta$ angle, for example, in Table 4—20° as compared with 22.5°—the readings are the highest. The same thing is true in the other Tables.

The transparent ultraviolet curable coating 14 has been applied in thicknesses of 0.00025 to 0.010 inches. Optimal results have been obtained with the coating applied in a range from 0.00050 to 0.001 inches. When using a coating with a thickness lower than this optimal range, the resultant angularity of the optical properties is decreased. When using a coating with a higher thickness, the angular optical properties are increased in relationship to the maximum values obtained, but the maximum values obtained are decreased. That is, the apparent illumination of the sample does not vary as greatly as the angle between the material and source and viewer vary, but the degree of illumination is decreased. Furthermore, when approaching the upper limit of the coating thickness, it becomes increasingly difficult to obtain a complete cure of the ultraviolet curable coating 14. This will be illustrated by a study of the following Examples.

EXAMPLE 5

The same procedure as in Example 2 was followed except that the ultraviolet curable coating 14 was 0.00025 inches in thickness.

EXAMPLE 6

The same procedure as in Example 5 was followed except that the ultraviolet curable coating 14 was 0.0005 inches in thickness.

EXAMPLE 7

The same procedure as in Example 5 was followed except that the ultraviolet curable coating 14 was 0.001 inches in thickness.

EXAMPLE 8

The same procedure as in Example 5 was followed except that the thickness of the ultraviolet curable coating 14 was 0.010 inches.

The samples produced in Examples 5–8 were examined for the amount of apparent luminescence at various illuminating and viewing angles. The results, including the results for Example 2, are set forth in Tables 5–8:

TABLE 5

| Sample | ∅ = 0° ∅ Angle 0° | 10° | 20° | 30° | 40° | 50° | Specular ∅ = 0° |
|---|---|---|---|---|---|---|---|
| | Photometer Readings | | | | | | |
| Retroreflective | 100 | 80.5 | 72.3 | 57.9 | 37.9 | 21.0 | |
| Example 5 | 42.6 | 10.8 | 6.7 | 5.6 | 5.6 | 5.1 | |
| Example 6 | 58.5 | 11.3 | 7.2 | 5.6 | 5.6 | 5.1 | |
| Example 2 | 71.3 | 11.3 | 7.2 | 6.4 | 5.4 | 5.1 | |
| Example 7 | 61.0 | 10.8 | 7.2 | 6.4 | 5.6 | 5.1 | |
| Example 8 | 24.1 | 11.3 | 7.2 | 6.4 | 5.4 | 5.1 | |

TABLE 6

| Sample | ∅ = 15° ∅ Angle 0° | 5° | 10° | 15° | 20° | Specular ∅ = 7.5° |
|---|---|---|---|---|---|---|
| | Photometer Readings | | | | | |
| Retroreflective | 2.6 | 6.7 | 7.7 | 2.6 | 2.1 | |
| Example 5 | 8.2 | 24.1 | 25.6 | 8.2 | 4.1 | |
| Example 6 | 8.7 | 37.4 | 36.4 | 8.7 | 4.1 | |
| Example 2 | 8.2 | 45.1 | 45.1 | 9.7 | 4.1 | |
| Example 7 | 8.2 | 31.8 | 32.3 | 9.2 | 4.1 | |
| Example 8 | 9.7 | 14.9 | 15.4 | 9.7 | 4.6 | |

TABLE 7

| Sample | ∅ = 30° ∅ Angle 0° | 10° | 15° | 20° | 30° | Specular ∅ = 15° |
|---|---|---|---|---|---|---|
| | Photometer Readiongs | | | | | |
| Retroreflective | 1.5 | 2.1 | 97.9 | 2.1 | 1.5 | |
| Example 5 | 3.6 | 27.7 | 51.8 | 26.2 | 3.1 | |
| Example 6 | 3.6 | 35.4 | 57.4 | 34.4 | 3.1 | |
| Example 2 | 3.6 | 57.9 | 72.8 | 55.4 | 3.1 | |
| Example 7 | 3.1 | 41.5 | 52.8 | 43.6 | 3.1 | |
| Example 8 | 4.1 | 10.8 | 17.4 | 11.8 | 4.1 | |

TABLE 8

| Sample | ∅ = 45° ∅ Angle 0° | 10° | 20° | 30° | 40° | Specular ∅ = 22.5 |
|---|---|---|---|---|---|---|
| | Photometer Readings | | | | | |
| Retroreflective | 1.5 | 2.1 | 20.0 | 2.1 | 1.0 | |
| Example 5 | 3.1 | 6.2 | 30.3 | 8.2 | 2.1 | |
| Example 6 | 3.1 | 6.7 | 37.4 | 10.8 | 2.1 | |
| Example 2 | 3.1 | 5.1 | 47.7 | 7.2 | 2.1 | |
| Example 7 | 3.1 | 5.6 | 36.4 | 7.2 | 2.1 | |
| Example 8 | 3.1 | 5.6 | 16.9 | 7.7 | 2.6 | |

These data show that the product produced in Example 5 does not show as high an apparent luminescence when the viewer and illuminant are separated from one another. The material from Example 8, while not showing the degree of variation when the viewing and illuminating angles are changed, shows a significant decrease in the amount of light reflected. While the product made outside of the optimal ultraviolet curable coating thickness range is not as good as product made within the optimal range, it could be considered acceptable for some applications.

A study of Tables 1 and 5 shows that the retroreflective material exhibits apparent luminescence at all illuminating angles tested, while the material of the instant invention fails to show apparent luminescence after the illuminating angle, $\phi$, exceeds 20°. Tables 2, 3, 4, 6, 7, and 8 examine the specular and diffuse reflective properties of the materials. The retroreflective material did not exhibit apparent luminescence at any combination of $\phi$ and $\theta$. When the illuminating angle, $\phi$, approached the specular angle for each viewing angle, $\theta$, the retroreflective material exhibited a reflection of the light source because of its smooth surface, rather than the apparent luminescence experienced when $\theta=0°$. The material of the instant invention, however, exhibited this visual apparent luminescence when the photometer readings exceeded 2.5. An examination of Tables 2, 3, 4, 6, 7, and 8 will show that the material of the instant invention shows this apparent luminescent quality at nearly all illuminating and viewing combinations.

By using the method described herein and the appropriate use of color, a variety of aesthetically pleasing results can be obtained, as will be seen from the following examples:

EXAMPLE 9

A 0.003 inch thick vacuum metalized polyester sheet 10 with pressure-sensitive adhesive 11 and releasable backing strip 12 was screen printed with the desired graphics with a transparent gold and transparent red ink of a polyester resin nature and these were dried for ten minutes at 130° F. between printing applications. An opaque black ink was then printed to cover the background area of the sheet, leaving the graphics visible in the transparent gold and red colors, and dried under the same conditions. A transparent ultraviolet curable coating was printed over the transparent red and transparent gold graphics at a thickness of 0.0009 inches. The sheet was placed on a conveyorized belt traveling at one foot per second and passed through a surface texturizing unit containing three G30T8 germicidal lamps placed 1.5 inches from the surface of the conveyor. The sheet was transferred to the conveyor of an ultraviolet curing unit traveling at 0.75 feet per second and irradiated with a high-intensity ultraviolet lamp powered at 200 watts per inch. The dwell time between exposures was nine seconds which allowed the top surface of the ultraviolet curable coating 14 to texture before being thoroughly cured. The resultant product was signage with a black background with transparent gold and transparent red apparent luminescent graphics which made the graphics highly visible under all lighting conditions.

An alternative method to the above is to eliminate the transparent ink referred to in Example 9 when colors are desired, and disperse a pigment or dye in the apparent luminescent coating 14 in the desired color.

Another alternative technique is to print the ultraviolet curable coating 14 on a clear substrate that is also coated on the reverse side with a clear adhesive and a releasable backing strip 12, followed by the two-step ultraviolet radiation process. Thus, by removing the releasable backing strip and pressing the composite to a sign or other graphics already in use that has been made by using transparent colors on a metalized surface, the sign exhibits apparent luminescence.

EXAMPLE 10

A 0.003 inch thick sheet of clear polycarbonate film 10 with an optically clear pressure-sensitive adhesive 11 with a releasable backing strip 12 was coated with a transparent ultraviolet curable coating 14 at a thickness of 0.001 inches. The sheet was placed on a conveyorized belt traveling 0.9 feet per second and passed through a surface texturizing unit containing two G30T8 germicidal lamps equipped with semi-circular reflectors to increase the light intensity. Nitrogen was dispensed into the surface texturizing unit at a rate of 150 SCFH/ft. width of the texturizing unit to exclude oxygen from the atmosphere. The sheet was transferred to the conveyor of an ultraviolet curing unit traveling 0.9 feet per second and irradiated with a high-intensity ultraviolet lamp powered at 100 watts per inch. The dwell time between exposures was 5.5 seconds which allowed the top surface of the ultraviolet curable coating to texture before being thoroughly cured. The releasable backing strip was removed from the pressure-sensitive adhesive and the sheet was laminated to signage that had been printed with opaque inks on specular reflective material. The resultant effect was signage that had a greatly increased contrast between the printed and nonprinted areas by giving the printed opaque areas a velvet appearance and the nonprinted specular reflective areas an apparent luminescent appearance.

Thus, it will be seen that the instant invention produces a variety of materials which may be colored or uncolored, as desired, that all show apparent luminescence under a variety of illuminating and viewing angles. While acknowledging that the retroreflective component of the apparent luminescence is limited in the angularity of the illumination, it is not the intent of the instant invention to provide a substitute for the present sphere inclusion retroreflective but provide an economical means of providing signage with increased visibility. The greatly increased diffuse and specular luminescence contained in the instant invention and not the retroreflective materials accomplishes this heightened visibility at a fraction of the cost of the retroreflective materials.

While this invention has been described in its preferred embodiment, it is appreciated that variations therefrom may remain without departing from the true scope and spirit of the invention.

What is claimed is:

1. An article of manufacture comprising a base film of from 0.00025 to 0.375 inches in thickness and an ultra violet curable film of from 0.00025 to 0.010 inches in thickness on said base film, said ultraviolet curable film having a textured surface of randomly disposed elevated areas and depressed areas capable of appearing luminescent.

2. The article of manufacture of claim 1 which appears luminescent and wherein said base is specularly reflective.

3. The article of manufacture of claim 1 wherein said base is transparent and is coated on the side opposite from the ultraviolet curable film with a transparent adhesive and a releasable backing strip.

4. The article of manufacture of claim 2 which is coated on the side opposite from the ultraviolet curable film with an adhesive and a releasable backing strip.

5. The article of manufacture of claim 2 in which there is a transparent colored film positioned between said specular reflective base film and said ultraviolet curable film.

6. The article of manufacture of claim 1 in which said ultraviolet curable film is pigmented.

7. The article of manufacture of claim 1 wherein said base film is from 0.00025 to 0.005 inches in thickness and said ultraviolet curable film is from 0.00050 to 0.001 inches in thickness.

8. A method of making an article of manufacture which is adapted to appear luminescent when applied to a specular reflective surface which comprises attaching an ultraviolet curable film of from 0.00025 to 0.010 inches in thickness to a base film of from 0.00025 to 0.375 inches in thickness and subjecting said ultraviolet curable film to sufficient very low-intensity ultraviolet light source so as to provide a surface cure of said ultraviolet curable film to a very small depth until a textured surface of randomly disposed elevated areas and depressed areas is formed which is capable of creating an apparent luminescent surface when applied to a specular reflective surface, followed by a high-intensity ultraviolet light treatment sufficient to cure the entire coating and permanently affix said texture surface of the coating created by the initial low-intensity ultraviolet radiation.

9. The method of making an article of manufacture comprising adhering an ultraviolet curable film of from 0.00025 to 0.010 inches in thickness to a base film of from 0.00025 to 0.375 inches in thickness, said base film being specularly reflective, and subjecting said ultraviolet curable film to sufficient very low-intensity ultraviolet light source so as to provide a surface cure of said ultraviolet curable film to a very small depth until a textured surface of randomly disposed elevated areas and depressed areas is formed, which in combination with said specular reflective base film creates an apparent luminescent surface, followed by a high-intensity ultraviolet light treatment sufficient to cure the entire coating and permanently affix said textured surface of the coating created by the initial low-intensity ultraviolet radiation.

10. The method of claim 8 wherein said ultraviolet curable film is from 0.00050 to 0.001 inches in thickness and said base film is from 0.00025 to 0.005 inches in thickness.

11. The method of claim 9 wherein said ultraviolet curable film is from 0.00050 to 0.001 inches in thickness and said base film is from 0.00025 to 0.005 inches in thickness.

12. The method of claim 8 which includes the additional steps of applying a clear adhesive to said base film on the side opposite said ultraviolet curable film and applying a releasable backing strip to said adhesive.

13. The method of claim 9 which includes the additional steps of applying an adhesive to said base film on the side opposite said ultraviolet curable film and applying a releasable backing strip to said adhesive.

14. The method of claim 9 which includes the step of inserting a transparent colored film between said base film and said ultraviolet curable film.

15. The method of claim 9 wherein said ultraviolet curable film is pigmented.

16. The method of claim 10 which includes the additional steps of applying a clear adhesive to said base film on the side opposite said ultraviolet curable film and applying a releasable backing strip to said adhesive.

17. The method of claim 11 which includes the additional steps of applying an adhesive to said base film on the side opposite asaid ultraviolet curable film and applying a releasable backing strip to said adhesive.

18. The method of claim 11 which includes the step of inserting a transparent colored film between said base film and said ultraviolet curable film.

19. The method of claim 11 wherein said ultraviolet curable film is pigmented.

20. The article of manufacture of claim 2 in which said base film is colored.

* * * * *

UNITED STATES PATENT AND TRADEMARK OFFICE

CERTIFICATE OF CORRECTION

PATENT NO. : 4,567,072

DATED : January 28, 1986

INVENTOR(S) : Ron P. Brainard, L. Wayne Cassidy

It is certified that error appears in the above-identified patent and that said Letters Patent are hereby corrected as shown below:

Columns 5, 6, 7, and 8, Tables 1-8: The phi angle should be theta.

Signed and Sealed this

*Sixth* Day of *May 1986*

[SEAL]

*Attest:*

DONALD J. QUIGG

*Attesting Officer* *Commissioner of Patents and Trademarks*